United States Patent
Martin et al.

(10) Patent No.: US 7,424,477 B1
(45) Date of Patent: Sep. 9, 2008

(54) SHARED SYNCHRONIZED SKIP-LIST DATA STRUCTURE AND TECHNIQUE EMPLOYING LINEARIZABLE OPERATIONS

(75) Inventors: Paul A. Martin, Arlington, MA (US); Guy L. Steele, Jr., Lexington, MA (US); Nir N. Shavit, Cambridge, MA (US); Steven K. Heller, Acton, MA (US); Mark S. Moir, Somerville, MA (US); Victor M. Luchangco, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 799 days.

(21) Appl. No.: 10/653,828

(22) Filed: Sep. 3, 2003

(51) Int. Cl.
*G06F 17/00* (2006.01)
*G06F 7/00* (2006.01)

(52) U.S. Cl. .................. 707/100; 707/8; 707/101; 707/102

(58) Field of Classification Search ............. 707/1–3, 707/8, 100–102
See application file for complete search history.

(56) References Cited

U.S. PATENT DOCUMENTS

| | | | |
|---|---|---|---|
| 4,584,640 | A | 4/1986 | MacGregor et al. |
| 5,081,572 | A | 1/1992 | Arnold |
| 5,224,215 | A | 6/1993 | Disbrow |
| 5,319,778 | A | 6/1994 | Catino |
| 6,128,710 | A | 10/2000 | Greenspan et al. |
| 6,144,965 | A | 11/2000 | Oliver |
| 6,178,423 | B1 | 1/2001 | Douceur et al. |
| 6,360,219 | B1 | 3/2002 | Bretl et al. |
| 6,360,220 | B1 | 3/2002 | Forin |
| 6,366,932 | B1 | 4/2002 | Christenson |
| 6,581,063 | B1 | 6/2003 | Kirkman |
| 6,651,146 | B1 | 11/2003 | Srinivas et al. |
| 6,826,757 | B2 | 11/2004 | Steele, Jr. et al. |
| 7,117,502 | B1 * | 10/2006 | Harris ................ 719/315 |
| 2001/0047361 | A1 | 11/2001 | Martin et al. |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2003/0182465 | A1 | 9/2003 | Moir et al. |

(Continued)

FOREIGN PATENT DOCUMENTS

EP     0 366 585     5/1990

(Continued)

OTHER PUBLICATIONS

Anderson, James H. et al., "Universal Constructions for Large Objects," *IEEE Transactions on Parallel and Distributed Systems*, vol. 10, No. 12, pp. 1317-1332, 1999.

Harris, T., et al., "Language Support for Lightweight Transactions," *Proc. 18th Annual ACM SIGPLAN Conf. on Object-Oriented Programming Systesm, Languages, and Applications*, pp. 388-402, ACM Press, New York, NY, 2003.

(Continued)

*Primary Examiner*—John Cottingham
*Assistant Examiner*—Susan F Rayyan
(74) *Attorney, Agent, or Firm*—Osha•Liang LLP

(57) ABSTRACT

A set of structures and techniques are described herein whereby an exemplary concurrent shared object, namely a shared skip list, can be implemented in a lock-free manner. Indeed, we have developed a number of interesting variants of a lock-free shared skip-list, including variants that may be employed to provide a lock-free shared dictionary. In some variants, a key-value dictionary is implemented.

19 Claims, 10 Drawing Sheets

U.S. PATENT DOCUMENTS

| | | | |
|---|---|---|---|
| 2004/0015510 A1 | 1/2004 | Moir et al. | |
| 2004/0015642 A1 | 1/2004 | Moir et al. | |
| 2004/0034673 A1 | 2/2004 | Moir et al. | |
| 2004/0153687 A1 | 8/2004 | Moir et al. | |
| 2008/0109608 A1* | 5/2008 | Shavit et al. | 711/141 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.

Jayanti, P., et al., "Efficient and Practical Constructions of LL/SC Variables," *Proceedings of the 22nd Annual ACM Symposium on the Principles of Distributed Computing*, pp. 285-294, ACM Press, New York, NY, 2003.

Martin, Paul et al., "DCAS-Based Concurrent Deques Supporting Bulk Allocation," Sun Microsystems, Inc. Technical Report SMI TR-2002-111, Oct. 2002.

Michael, Maged M. et al., "Non-Blocking Algorithms and Preemption Safe Locking on Multiprogrammed Shared Memory Multiprocessors," *Journal of Parallel and Distributed Computing*, vol. 51, No. 1, pp. 1-26, May 25, 1998.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," *IEEE Transactions on Computers*, vol. 43, No. 5, pp. 548-559, May 1994.

Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.

Shavit, N., et al., "Elimination Trees and the Construction of Pools and Stacks," *Theory of Computing Systems*, vol. 30, pp. 645-670, 1997.

Shavit, N., et al., "Software Transactional Memory," *Distributed Computing*, vol. 10, No. 2, pp. 99-116, Feb. 1997.

Valois, John D., "Lock-Free Linked Lists Using Compare-and-Swap," *Proceedings of the Fourteenth ACM Symposium on Principles of Distributed Computing*, pp. 214-222, ACM Press, New York, NY 1995.

Herlihy, M.P., et al., "Linearizability: A Correctness Condition For Con-Current Objects," *ACM Transactions On Programming Languages and Systems*, 12(3):463-492, Jul. 1990.

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology For Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization And Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling For Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots In O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.: "DCAS-Based Concurrent Deques," *SPAA 2000. Proceedings of the 12th Annual ACM Symposium on Parallel Algorithms and Architectures*, pp. 134 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

Herhily, Maurice P. et al., "*Linearizability: A Correctness Condition for Concurrent Objects*", ACM Transcations on Programming Languages and Systems, vol. 12, No. 3, pp. 463-492, Jul. 1990.

Lotan, Italy et al., "*Skiplist-Based Concurrent Priority Queues*", Proceedings of the First International Parallel and Distributed Processing Symposium, May 2000.

Pugh, William, "*Concurrent Maintenance of Skit Lists*", CS-TR-2222.1, Institute for Advanced Computer Studies, Dept. of Computer Science, University of Maryland, College Park, Jun. 1990.

Pugh, William, "*Skip Lists: A Probabilistic Alternative to Balanced Trees*", Communications of the ACM, vol. 33, No. 6, pp. 668-676, Jun. 1990.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

* cited by examiner

SHARED SYNCHRONIZED SKIP-LIST DATA STRUCTURE AND TECHNIQUE EMPLOYING LINEARIZABLE OPERATIONS

BACKGROUND

1. Field of the Invention

The present invention relates generally to coordination amongst execution sequences in a multiprocessor computer, and more particularly, to structures and techniques for facilitating non-blocking implementations of shared data structures.

2. Description of the Related Art

A dictionary is an abstract data structure that associates with each of some number of keys a respective value. Depending on the exploitation, keys and values can be data items or data structures. Typical dictionary operations include: insert(k, v), which alters the dictionary so that it associates the value v with the key k, delete(k), which alters the dictionary so that it does not associate any value with the key k; and search(k), which returns the value that the dictionary associates with key k or an appropriate null value if the dictionary does not currently associate any value with key k.

There are, of course, a variety of alternate formulations of dictionaries that are useful for various purposes. Such formulations may provide different operational semantics, or differ in the details of their operations. Exemplary dictionary formulations, including an exemplary formulation (deleteGE (n)) in which a "greater than or equal to" key match criterion is employed for deletions, are described elsewhere herein. Numerous variations on the general theme are possible and, in general, dictionary data structures and suitable concrete implementations thereof, are well known in art. For example, a linked list of nodes that encode key-value pairs forms the basis of a number of suitable implementations. In some implementations, the list of key-value pairs may be sorted in increasing key order. Other implementations include those based on various forms of hash table, e.g., where a hash-table entry may contain both a key and a value.

Still other implementations employ a tree structure, such as a binary tree, where key-value pairs are at the leaves of the tree and every node also contains a key, such that all leaves that are descendants of a node's left-hand child have keys that are less than the node's key and all leaves that are descendants of the node's right-hand child have keys that are not less than the node's key. This arrangement allows an insert, delete, or search operation to be performed in time proportional to the height of the tree. If the tree is balanced, then the height of the tree is proportional to the logarithm of the number of nodes in the tree, so that insert, delete, and search operations may be carried out relatively quickly. However, certain sequences of insert and/or delete operations may leave the tree badly unbalanced. There are many techniques in the computer science literature, known to those of skill in the art, for rebalancing trees as needed.

Pugh has proposed a data structure called a skip list, which he describes as a probabilistic alternative to balanced trees. See W. Pugh, *Skip Lists: A Probabilistic Alternative to Balanced Trees*, Communications of the ACM, 33(6):668-676, June 1990 and W. Pugh, *Concurrent Maintenance of Skip Lists*, CS-TR-2222. 1, Institute for Advanced Computer Studies, Department of Computer Science, University of Maryland, College Park, June 1990. We believe that a skip list, particularly as described elsewhere herein, is suitable for use as a concrete implementation of a dictionary.

In some computational environments, including those that could be employed to execute computations that use dictionaries implemented using a skip list, data structures are shared amongst multiple concurrent threads or processes. In such computations, it is desirable for the implementation to behave in a linearizable fashion; that is, to behave as if each operation on that data structure is performed atomically at some point between its invocation and its response. See M. Herlihy and J. Wing, *Linearizability: A Correctness Condition for Concurrent Objects*, ACM Transactions on Programming languages and Systems, 12(3):463-492, July 1990, for a discussion of linearizability as a correctness criterion.

One way to achieve this property is with a mutual exclusion lock (sometimes called a semaphore). Indeed, Pugh as well as Lotano & Shavit (each summarized below) disclose skip list implementations that employ locks. In general, locking implementations can be understood as follows. When a process issues a request to perform an operation on a shared data structure, its action is to acquire the lock, which has the property that only one process may own it at a time. Once the lock is acquired, the operation is performed on the data structure; only after the operation has been completed is the lock released. This sequence clearly enforces the property of linearizability. However, it is also desirable for operations to interfere with each other as little as possible. For example, it is desirable that two search operations be almost entirely concurrent, rather than one search having to wait to begin until another is entirely finished. Both Pugh's technique and Lotan & Shavit's technique employ locks, though in ways that allow at least some concurrent operations to execute without interference.

In particular, Pugh discloses a technique for implementing a skip list that may be shared by concurrent threads (concurrent processes). The technique includes algorithms that, rather than using a single lock for the entire data structure, associate respective locks with many different parts of the data structure and carefully choose which locks to lock at any given time, so as to ensure that one thread has exclusive access to the associated part of the data structure until that same thread performs a matching unlock operation, while not requiring exclusive access to other parts of the data structure. See W. Pugh, *Concurrent Maintenance of Skip Lists* (referenced above).

Lotan and Shavit disclose another technique for implementing a skip list that may be shared by concurrent threads and use it to implement a priority queue. Their technique involves allowing a thread to lock a node before deleting it so that the locking thread, and no other, may delete that node from the data structure. See I. Lotan & N. Shavit, *Skiplist-Based Concurrent Priority Queues*. In Proc. First International Parallel and Distributed Processing Symposium, Cancun, Mexico, May 2000.

Unfortunately, the use of locks has certain drawbacks. In particular, algorithms and shared data structure implementations that employ locks (even on a fine grain basis) are vulnerable to the possibility that individual threads or processes may proceed at very different rates of execution and, in particular, that some thread or process might be suspended indefinitely. Accordingly, it can be highly desirable for an implementation of a shared data structure to be lock-free; that is, if a set of processes are using a shared data structure and an arbitrary subset of those processes are suspended indefinitely, it should still be possible for the remaining processes to make progress in performing operations on the shared data structure. What is needed is a lock-free linearizable implementation of shared skip list.

SUMMARY

A set of structures and techniques are described herein whereby an exemplary concurrent shared object, namely a shared skip list, can be implemented in a lock-free manner. Indeed, we have developed a number of interesting variants of a lock-free shared skip-list, including variants that may be employed to provide a lock-free shared dictionary. In some variants, a key-value dictionary is implemented. Although lock-free, shared skip list implementations and dictionary exploitations exemplify several advantages of realizations in accordance with the present invention, the present invention is not limited thereto. In some variants, a set is implemented, using the key slots to hold set elements and omitting the value slots. Indeed, based on the description herein and the claims that follow, persons of ordinary skill in the art will appreciate a variety of concurrent shared object implementations. For example, using a skip list as a priority queue without requiring an a priori determination of the set of all possible priority levels to be used.

Furthermore, although various implementations described herein employ a particular set of synchronization primitives, namely compare and swap (CAS) and double compare and swap (DCAS) operations, the present invention is not limited to CAS- and DCAS-based realizations. Indeed, a variety of synchronization primitives may be employed that allow linearizable update of at least a pair of storage locations. In general, N-way Compare and Swap (NCAS) operations (N≧2) or transactional memory may be employed. In addition, load-linked (LL) and store-conditional (SC) operation pairs may be employed as an alternative to CAS operations. More generally, choice of an appropriate synchronization primitive is typically affected by the set of alternatives available in a given computational system. While direct hardware- or architectural-support for a particular primitive is preferred, software emulations that build upon an available set of primitives may also be suitable for a given implementation. Accordingly, any synchronization primitive that allows access operations to be implemented with substantially equivalent semantics to those described herein is suitable.

Accordingly, in view of the above, a novel skip-list-based concurrent shared object implementation has been developed that provides lock-free and linearizable access to state of the concurrent shared object. In an application of the underlying techniques to a shared dictionary, insert-type and delete-type operations on the dictionary are linearizable and lock-free. Indeed, in a typical exploitation, all operations on the shared dictionary exhibit linearizable, lock-free behavior. Typically, concurrent operations on the shared dictionary execute without interference and, if present, interference is generally limited to operations that compete to modify a given node and/or related pointers.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
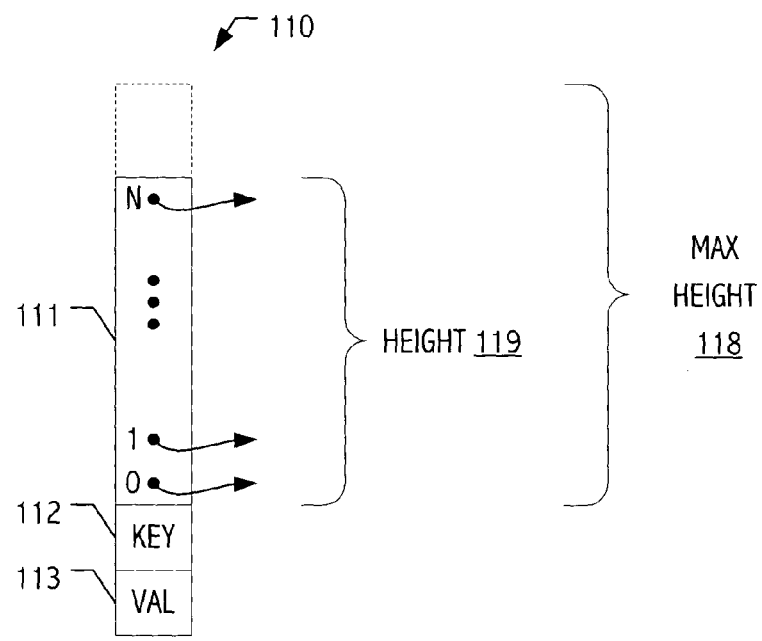
FIG. 1 illustrates structure of a node for use in an implementation of a key-value skip list data structure implemented in accordance with some embodiments of the present invention.

The description that follows presents a set of techniques, objects, functional sequences and data structures associated with concurrent shared object implementations that employ linearizable synchronization operations in accordance with an exemplary embodiment of the present invention. A lock-free, linearizable shared dictionary implementation that employs compare-and-swap (CAS) and double compare-and-swap (DCAS) operations is illustrative. In general, such a shared dictionary is a good exemplary implementation in that it has wide applicability to parallel and/or multithreaded computations in which it is desirable to dynamically maintain ordered mappings in a shared data structure. Of course, dictionaries are susceptible to a wide range of variations in data mappings, orderings and access semantics and particular techniques, objects, functional sequences and data structures are presented herein in the context of particular key-value mappings orderings and operations. In particular, use and implementations of insert and deleteGE operations are merely illustrative. Based on the descriptions herein, variations suitable for other data mappings, orderings and access semantics will be appreciated by persons of ordinary skill in the art. Indeed, based on the descriptions herein, variations suitable for other exploitations of a lock-free shared skip list or skip-list-like data structure will be appreciated by persons of ordinary skill in the art.

In view of the above, and without limitation, the description that follows focuses on an exemplary linearizable, lock-free shared key-value dictionary implementation based on a skip list that behaves as if access operations thereon are executed in a mutually exclusive manner, despite the absence of a locking mechanism.

Computational Model

One realization of the present invention is as a skip list based, key-value dictionary implementation employing CAS and DCAS operations on a shared memory multiprocessor computer. This realization, as well as others, will be understood in the context of the following computational model, which specifies the concurrent semantics of the skip-list data structure.

In general, a concurrent system consists of a collection of n processors. Processors communicate through shared data structures called objects. Each object has an associated set of operations that provide the mechanism for manipulating state of that object. Each processor P can be viewed in an abstract sense as a sequential thread of control that applies a sequence of operations to objects by issuing an invocation and receiving the associated response. A history is a sequence of invocations and responses of some system execution. Each history induces a "real-time" order of operations where an operation A precedes another operation B, if A's response occurs before B's invocation. Two operations are concurrent if they are unrelated by the real-time order. A sequential history is a history in which each invocation is followed immediately by its corresponding response. The sequential specification of an object is the set of legal sequential histories associated with it. The basic correctness requirement for a concurrent implementation is linearizability. Every concurrent history is "equivalent" to some legal sequential history which is consistent with the real-time order induced by the concurrent history.

In a linearizable implementation, an operation appears to take effect atomically at some point between its invocation and response. In the computational model described herein, the collection of shared memory locations of a multiprocessor computer's memory (including location L) is a linearizable implementation of an object that provides each processor $P_i$ with the following set of sequentially specified machine operations:

Read$_i$ (L) reads location L and returns its value.

Write$_i$ (L,v) writes the value v to location L.

CAS$_i$ (L, o, n) is a compare-and-swap operation with the semantics described below.

DCAS$_i$ (L1, L2, o1, o2, n1, n2) is a double compare-and-swap operation with the semantics described below.

Implementations described herein are lock-free. Let us use the term higher-level operations in referring to operations of the data type being implemented, and lower-level operations in referring to the (machine) operations in terms of which it is implemented. A lock-free implementation is one in which, even though individual higher-level operations may be delayed, the system as a whole continuously makes progress. More formally, a lock-free implementation is one in which any infinite history containing a higher-level operation that has an invocation but no response must also contain infinitely many responses. In other words, if some processor performing a higher-level operation continuously takes steps and does not complete, it must be because some operations invoked by other processors are continuously completing their higher-level operations. This definition guarantees that the system as a whole makes progress and that individual processors cannot be blocked, only delayed by other processors continuously taking steps.

Dictionaries

As described above, a dictionary is an abstract data structure. While some variants may contain only keys and not associated values (these are called sets), key-value formulations are typically more useful in practical programming applications. A key-value dictionary associates with each of some number of keys, a respective value. Depending on the exploitation, keys and values can be data items or data structures. Typical dictionary operations include: insert(k, v), which alters the dictionary so that it associates the value v with the key k, delete(k), which alters the dictionary so that it does not associate any value with the key k; and search(k), which returns the value that the dictionary associates with key k or an appropriate null value if the dictionary does not currently associate any value with key k.

There are, of course, a variety of alternate formulations of dictionaries that are useful for various purposes. Such formulations may provide different sets of operations, or differ in the details of their operations. For example, if a dictionary already associates a value $v_1$ with key k, then the operation insert(k, $v_2$) might alter the dictionary to associate $v_2$ with k, or might have no effect, or might result in the dictionary associating the value $v_1+v_2$ with k. Of course, addition is but one possible operator.

One interesting variant provides two operations: insert(k, v) and deleteGE(k) and assumes that the keys are totally ordered by a comparison operation that determines whether one given key is smaller than another given key. The operation insert(k, v) alters the dictionary to associate the value v with k, regardless of whether the dictionary already associated some value with k, but then returns either the previously associated value or the special value INSERTED according to whether the dictionary did or did not (respectively) already associate some value with the key k. The operation deleteGE(n) identifies the smallest key k that is not smaller than n and that has an associated value in the dictionary, then alters the dictionary so that it no longer associates any value with the key k and returns the value that was formerly associated with k; but if there is no such key k in the dictionary, then the special value NOTFOUND is returned by the operation.

Skip List

In brief, a skip list includes a linked list of nodes. In our formulation, each node includes a key-value pair. Each node also includes a nonzero number of pointers. Each such pointer belongs to a level, where a level is labeled by a positive integer ranging from 0 to MaxHeight−1. If a node contains k pointers, it contains one pointer for each level from level 0 through levelk−1. The last node in the skip list is a special Null node that contains no key, value, or pointers; although it may logically have various of these set to values that simplify or speed operations in which it is used. The first node in the skip list (the Header) contains MaxHeight pointers but no key or value (again, these could be set to ease or speed any particular implementation). The level-0 pointers link all the nodes of the list beginning with the Header and ending with the Null node, in such a way that the keys appear in ascending order as the level-0 links are traversed from the header, just as for a conventional sorted linked list.

In addition, every node obeys an additional constraint: if any node (call it A) contains a level-j pointer for some j>0, then it points to another node (call it B) that occurs later in the linked list formed by the level-0 pointers, such that node B either has a level-j pointer or is the Null node, and no node that occurs in the list between A and B has a level-j pointer.

Synchronization Operations

Certain computer systems provide primitive instructions or operations that perform compound operations on memory in a linearizable form (as if atomically). Two exemplary operations of this type are the compare-and-swap operation (CAS) and the double-compare-and-swap operation (DCAS).

As typically defined, a CAS operation accepts three values or quantities: a memory address A, a comparison value C, and a new value N. The operation fetches and examines the contents V of memory at address A. If those contents V are equal to C, then N is stored into the memory location at address A, replacing V; otherwise, the contents of the memory at address A are not affected. In some variants, V may be returned or saved in a register for later inspection whether or not V matches C. All this is implemented in a linearizable fashion.

Some formulations of a CAS operation may be understood as follows:

```
boolean CAS(val *addr, val old, val new) {
    atomically {
        if (*addr==old) {
            *addr = new;
            return true;
        } else {
            return false;
        }
    }
}
```

A more powerful (and often more convenient) operation is the double compare-and-swap (DCAS) operation. As typically defined, a DCAS operation accepts six values: memory addresses A1 and A2, comparison values C1 and C2, and new values N1 and N2. The operation fetches and examines the contents V1 of memory at address A1 and the contents V2 of memory at address A2. If V1 equals C1 and V2 equals C2, then N1 is stored into the memory location at address A1, replacing V1, and N2 is stored into the memory location at address A2, replacing V2; otherwise, the contents of the memory at addresses A1 and A2 are not affected. In some variants, V1 and V2 are returned or saved in registers for later inspection whether or not V1 matches C1 and whether or not V2 matches C2. All this is implemented in a linearizable fashion.

Some formulations of a DCAS operation may be understood as follows:

```
boolean DCAS(val *addr1, val *addr2,
             val old1, val old2,
             val new1, val new2) {
    atomically {
        if ((*addr1==old1) && (*addr2==old2)) {
            *addr1 = new1;
            *addr2 = new2;
            return true;
        } else {
            return false;
        }
    }
}
```

CAS and DCAS operations are well known in the art and have been implemented in hardware, such as in the SPARC™ and IBM 370 processor architectures (CAS) and Motorola 68040 processor architecture (DCAS), as well as through software emulation. Accordingly, a variety of suitable implementations exist and the pseudocode formulations (above) are meant to facilitate later description of concurrent shared object implementations in accordance with the present invention and not to limit the set of suitable implementations. For example, order of operations is merely illustrative and any implementation with substantially equivalent semantics is also suitable. Similarly, some formulations (such as described above) may return previous values while others may return success/failure indications. In general, any of a variety of formulations are suitable including those based on hardware support, non-blocking software emulations, transactional memory constructs, etc. SPARC architecture based processors are available from Sun Microsystems, Inc, Santa Clara, Calif. SPARC trademarks are used under license and are trademarks or registered trademarks of SPARC International, Inc. in the United States and other countries. Products bearing SPARC trademarks are based upon an architecture developed by Sun Microsystems.

Furthermore, although much of the description herein is focused on compare-and-swap (CAS) and double compare-and-swap (DCAS) operations, it will be understood that other synchronization operations such as N-location compare-and-swap operations (N≧2) or transactional memory may be employed in other implementations. In addition, load-linked (LL) and store-conditional (SC) operation pairs may generally be employed in place of CAS operations, and if an extended version of LL/SC allowed two or more addresses to be treated under the "linked" condition, that extended LL/SC could be employed in place of the DCAS operation. In short, choice of an appropriate synchronization primitive is typically affected by the set of alternatives available in a given computational system and, based on the description herein, persons of ordinary skill in the art will appreciate a variety of suitable alternatives.

Lock-Free Shared Skip List

FIG. 1 illustrates structure of a node suitable for use in some implementations of a key-value skip list data structure. As illustrated, a given node 110 includes storage for a key 112 and an associated a value 113, which may encode a literal value or, in some realizations, a reference to a literal value or to an appropriate data structure. Solely for clarity of description, and without limitation, the description that follows generally assumes a literal value encoding. Variations for other encodings will be appreciated by persons of ordinary skill in the art.

In the illustrated node structure, a non-zero number of levels of references (or next pointers) 111 may be employed to reference forward to respective other nodes in a skip list data structure (or otherwise as described later). For example, a particular node (e.g., illustrated node 110) may include an array of N+1 next pointers, defining a height 119 for the node. All nodes in a given skip list have a height less than or equal to the maximum height established for the skip list at its creation, MaxHeight (118 in FIG. 1). FIG. 1 illustrates a typical state for a node incorporated in a skip list such as described below. Of course, based on the description herein, persons of ordinary skill in the art will appreciate a variety of suitable alternative encodings.

Figure 2A:
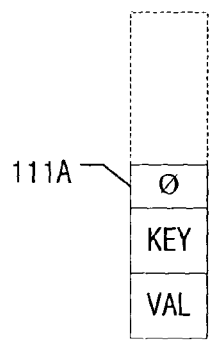
FIGS. 2A and 2B illustrate respective exemplary node states related to a skip list data structure implemented in accordance with some embodiments of the present invention.
Figure 2B:
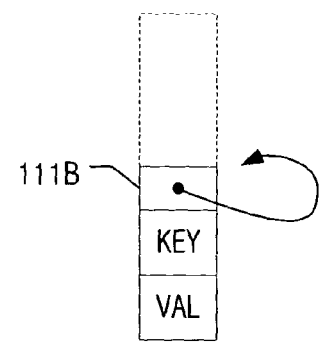

FIGS. 2A and 2B illustrate suitable encodings for nodes in two significant states in which a node is not incorporated in the skip list. For example, the state illustrated in FIG. 2A, namely with null level-0 pointer 111A, corresponds to a freshly created node not yet included in the skip list. The state illustrated in FIG. 2B, namely with a dead level-0 pointer 111B (here encoded as a self-pointer) corresponds to a node deleted from the skip list. Alternative dead pointer encodings and related techniques are described elsewhere herein.

Figure 3:
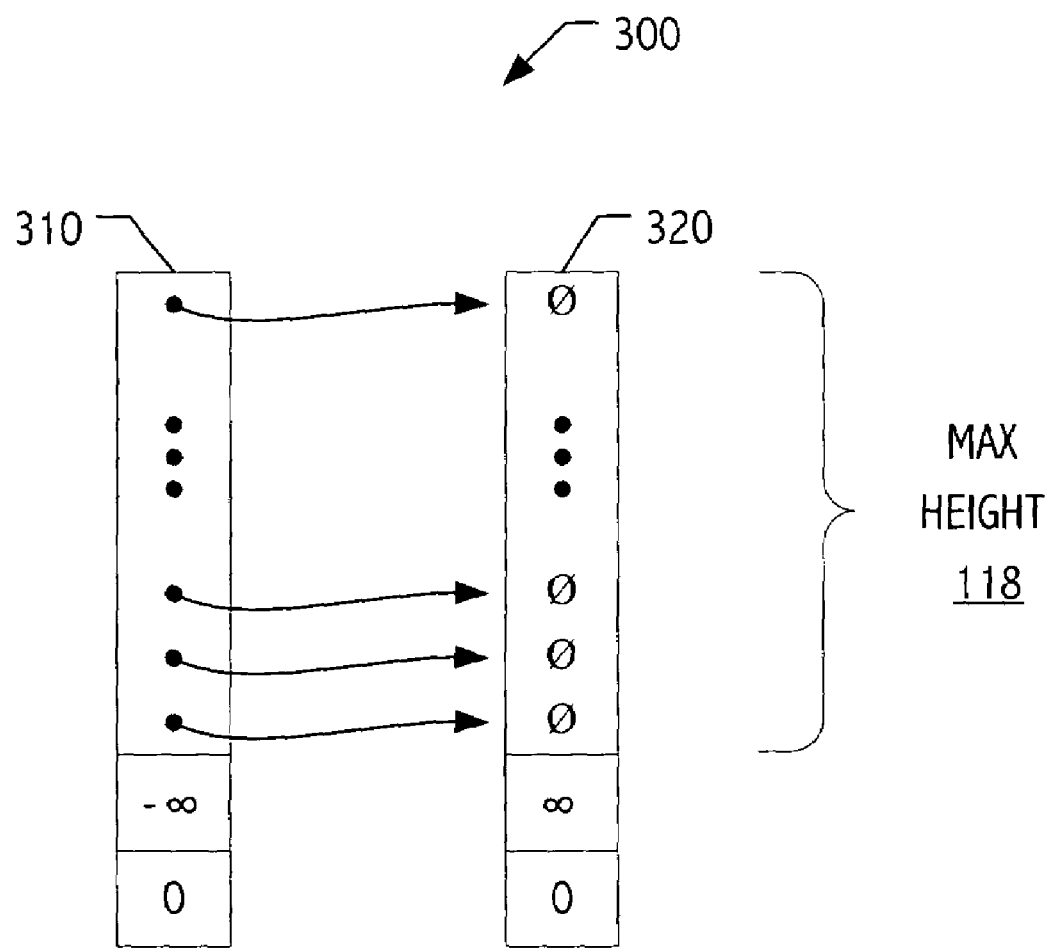
FIG. 3 illustrates an empty state of a key-value skip list data structure implemented in accordance with some embodiments of the present invention.

FIG. 3 illustrates an empty state of a key-value skip list data structure, such as what occurs immediately after initialization. In particular, skip list 300 includes a head node 310 and a tail (or Null) node 320. Each of the next pointers of head node 310 (i.e., level-0 through level-MaxHeight−1 next pointers) point to tail node 320. In turn, each of the next pointers of tail node 320 are null. Consistent with the head and tail roles of nodes 310 and 320, key fields thereof are illustrated with −∞ and ∞ key values, respectively. Corresponding value fields are arbitrarily shown as 0. Of course, any of a variety of key, value and terminating pointer encodings or conventions are possible and, based on the description herein, persons of ordinary skill in the art will be able to select an encoding or convention appropriate to a given application.

Also, based on the description herein, any of a variety of suitable concrete implementations will be appreciated by persons of ordinary skill in the art. Nonetheless, to facilitate our description, we present the following exemplary implementation of a skip list in which one suitable structural definition for nodes and a skip list thereof is provided together with an initialization sequence.

```
class Skiplist {
    private class Node {
        final Node[ ] next;
        final val key;
        val value;
        Node(int height, val key, val value) {
            /* Allocator sets all elements of array
                next initially null. */
            next = new Node[height];
            this.key = key;
            this.value = value;
        }
    }
    private final Node Head;
    private final Node NullNode;
    private final int MaxHeight;
    public Skiplist(int maxHeight) {
        MaxHeight = maxHeight;
        Head = new Node(maxHeight, -infinity, 0);
        NullNode = new Node(maxHeight, infinity, 0);
        for (int k = 0; k < maxHeight; k++)
            Head.next[k] = NullNode;
    }
    ...
}
```

Figure 4:
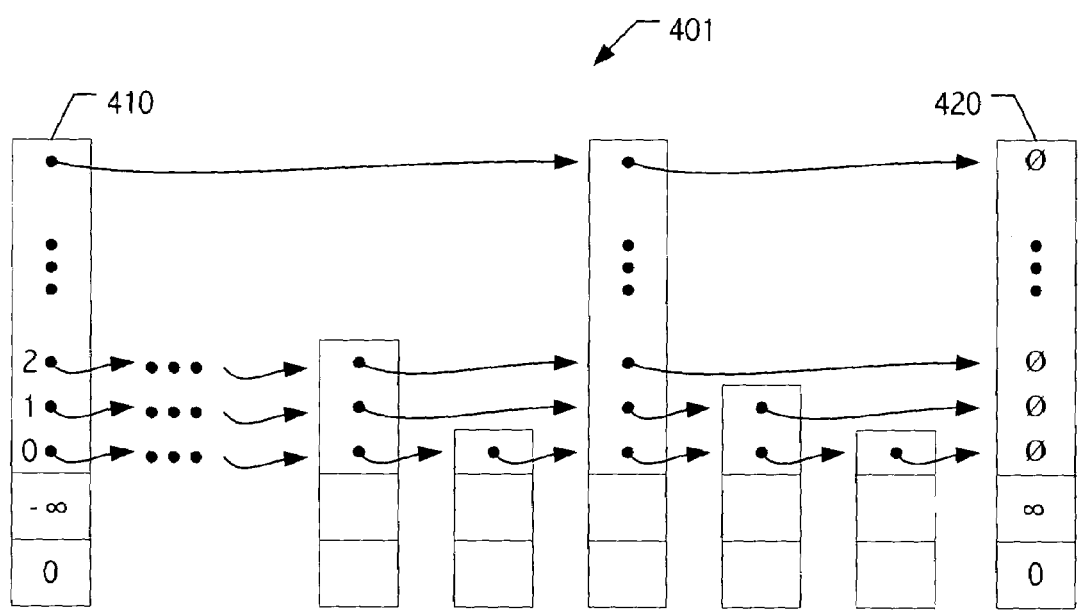
FIG. 4 illustrates a non-empty state of a key-value skip list data structure implemented in accordance with some embodiments of the present invention.

FIG. 4 illustrates an arbitrary non-empty state of a key-value skip list data structure. In general, a node is regarded as being in skip list 401 if and only if it is part of the chain of nodes connected by level-0 pointers, starting from the head node (e.g., head node 410) and continuing through the tail node (e.g., null node 420). As typically employed, pointers at other levels are regarded merely as hints which can be used to improve performance by allowing traversal operations (e.g., searches) to skip groups of nodes rather than examining every node in the chain. Consistent with this usage, we often refer to hints in our description. This terminology is used for simplicity of description and is not intended to limit the range of exploitations of skip list or skip list like data structures and techniques described herein.

In an illustrative configuration, each pointer in the next array of a node that is in the skip list is in one of three states: (a) null, meaning that a hint pointer has not yet been installed; (b) pointing to a node that has a higher key or to the tail node (i.e., a next pointer); or (c) dead. In general, suitable encodings are implementation dependent, but several dead pointer encodings are illustrative. In some variations, a pointer in the next array of a given node N is considered dead if it is a pointer to node N itself. Such a pointer is generally called a self pointer. In some variations, a pointer is considered dead if it points to a special dead node. The dead node is never in the skip list and, as typically realized, there is only one such dead node. A pointer to such a node is called a dead node pointer. In some variations, a pointer is dead if it points to a node with a smaller key (or back to the head node). Such a pointer is called a back pointer.

Each of these variations on a dead pointer encoding has certain advantages over the others. For example, a self pointer, as compared to a dead node pointer, avoids the need for a separate dead node. On the other hand, a dead node pointer, as compared with a self pointer, avoids the problem posed by circular references when maintaining reference counts if the skip list structure is used within a larger system that maintains reference counts for pointers. Both self pointers and dead node pointers, as compared with a back pointer, do not require a comparison of key values to decide whether a pointer is dead. On the other hand, a back pointer, as compared with either a self pointer or a dead node pointer, facilitates implementations that provide faster recovery in situations where a thread discovers that the node it was working on is not the right one after all. Accordingly, in view of the above, persons of ordinary skill in the art will appreciate that a variety of encodings may be employed and that selection of a particular encoding will, in general, depend on the intended application (or usage) environment.

The pointers in the next array of a node form three contiguous sets: the next pointers, the null pointers, and the dead pointers. The set of null pointers may be empty and the set of dead pointers may be empty. The next pointers are at the lowest levels (smallest indices) of the array; the dead pointers, if any, are at the highest levels; and the null pointers, if any, lie in the middle, below the dead pointers, if any, and above the next pointers.

As previously discussed, the skip list data structure may be (and typically is) shared by two or more threads, each of which may invoke access methods or operations at any time. In the exemplary skip list described below, such access methods include insert and deleteGE methods. Multiple executions of the insert and deleteGE methods may be carried out concurrently and no part of the data structure is ever locked at any time for the exclusive use of any particular thread. Instead, lock-free, linearizable synchronization operations are employed to synchronize the actions of these multiple executions. In some implementations (and in the illustrative code herein), compare-and-swap (CAS) and double-compare-and-swap (DCAS) operations are employed to provide the desired synchronized updates to skip list state. While CAS- and DCAS-based implementations are generally preferred, other linearizable, lock-free single-target and multi-target synchronization primitives (or constructs) may be employed in other implementations. In general, capabilities and efficiencies of synchronization primitives or constructs available in a given execution environment will tend to dictate suitable design choices. In any case, based on the description herein, persons of ordinary skill in the art will appreciate suitable transformations of the described techniques for implementations in which alternative synchronization primitives or constructs are (or may be) employed.

Turning now to operations on the skip list structure, we first describe an illustrative insert operation that introduces into the skip list a key-value pair. If the skip list already contains a node with an identical key, the associated value is updated;

however, if no identical key is found, a new node containing the desired key-value pair is spliced into the skip list. To identify the appropriate insertion point (or node), a helper routine (insertSearch) is employed to identify (at each pointer level of the skip list) appropriate predecessor and successor nodes for the insertion point (or existing node) at which the key-value pair should be introduced. Of course, the identification of predecessor and successor node sets is susceptible to skip list changes introduced by concurrent executions of other insert operations as well as concurrent executions of delete-type operations. Operation of an exemplary insert routine that appropriately synchronizes with other such executions will be understood with reference first to the following exemplary implementation of an insertSearch routine.

```
/* This routine takes a key and searches the skiplist. It
   returns results in two supplied arrays, predecessors and
   successors, each of length MaxHeight.
 */
private void insertSearch(val searchKey, Node[ ] predecessors,
                  Node[ ] successors) {
  newSearch: while (true) {
    Node pred = Head;
    Node succ;
    for (int k = MaxHeight – 1; k >= 0; k--) {
      while ((succ = pred.next[k]) != NullNode &&
            succ.key < searchKey) {
        if (deadPointer(pred, succ)) {
          /* We got stuck on a deleted node and must retry. */
          continue newSearch; // "continue" means do loop again
        } else pred = succ;
      }
      if (deadPointer(pred, succ)) {
        /* We got stuck on a deleted node and must retry. */
        continue newSearch;
      } else {
        predecessors[k] = pred;
        successors[k] = succ;
      }
    }
    return;
  }
}
``` where a deadpointer routine or macro such as illustrated below allows us to isolate implementation variations for realizations that encode dead pointers using a DeadNode construct or a self-pointer.

```
private boolean deadPointer(Node nd, Node np) {
  /// DeadNode version
  return (np == DeadNode);
  /// self-pointer version
  return (nd == np);
}
```

In either case, the insert routine (see below) employs the insertSearch helper routine to identify appropriate predecessor and successor sets. If the level-0 pointer of the successor set identifies a skip list node that encodes the to-be-inserted key, we attempt to update that node with the to-be-inserted value. Otherwise, we attempt to introduce a new node for the key-value pair splicing into appropriate levels of the next pointer chains in accordance with the identified predecessor and successor sets.

Figure 5:
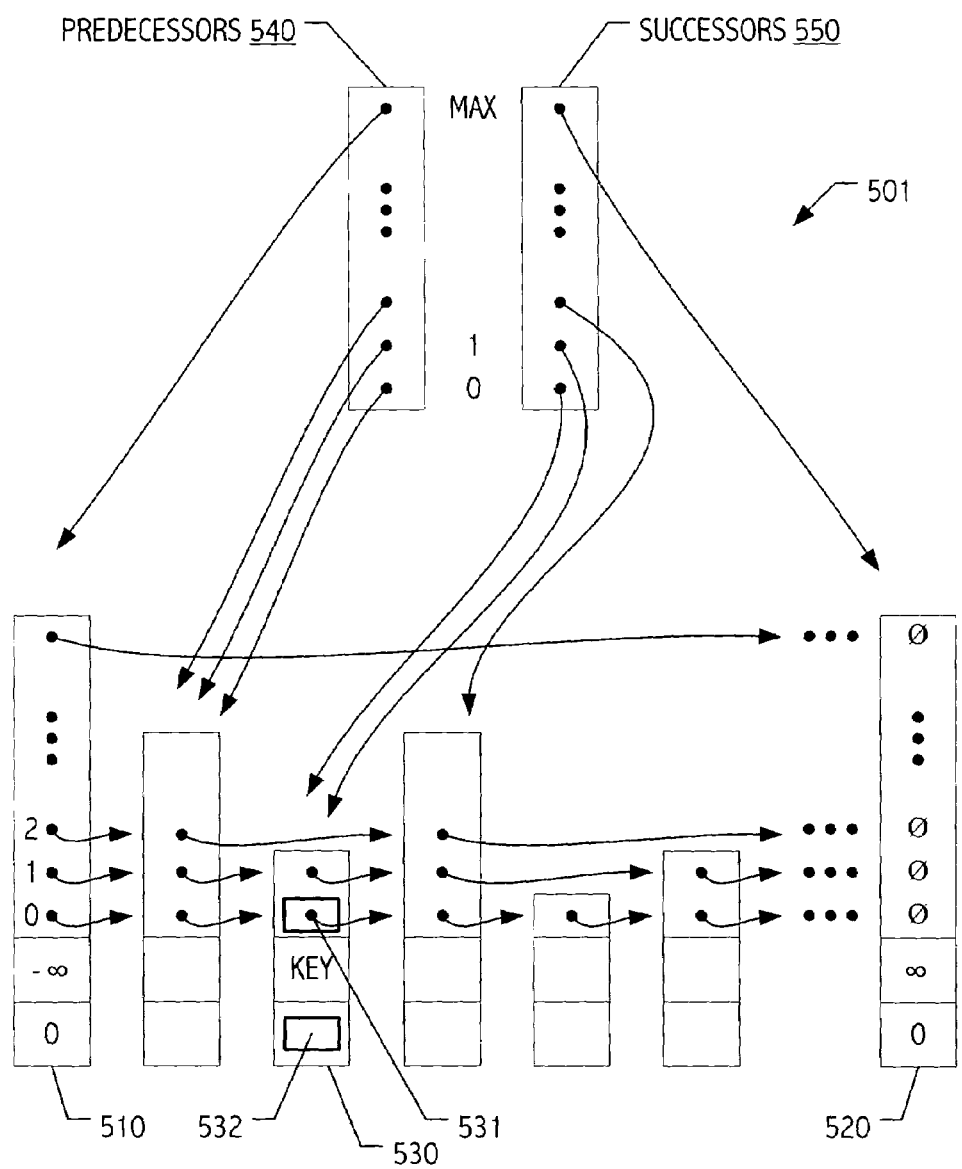
FIG. 5 illustrates an exemplary state of a key-value skip list data structure consistent with some update-oriented executions of a lock-free linearizable insert operation implemented in accordance with some embodiments of the present invention.

Turning first to the update case, FIG. 5 illustrates a state 501 of the skip list and corresponding predecessor 540 and successor 550 arrays computed using techniques such as illustrated above with reference to the insertSearch helper routine. Note that the level-0 pointer of successor array 550 (i.e., successor[0]) identifies a skip list node 530 with a key identical to that for the key-value pair we are inserting. We use a DCAS operation to update the node value while ensuring that both the existing value (in field 532) and the level-0 next pointer (in field 531) thereof remain unchanged since last read.

Figure 6:
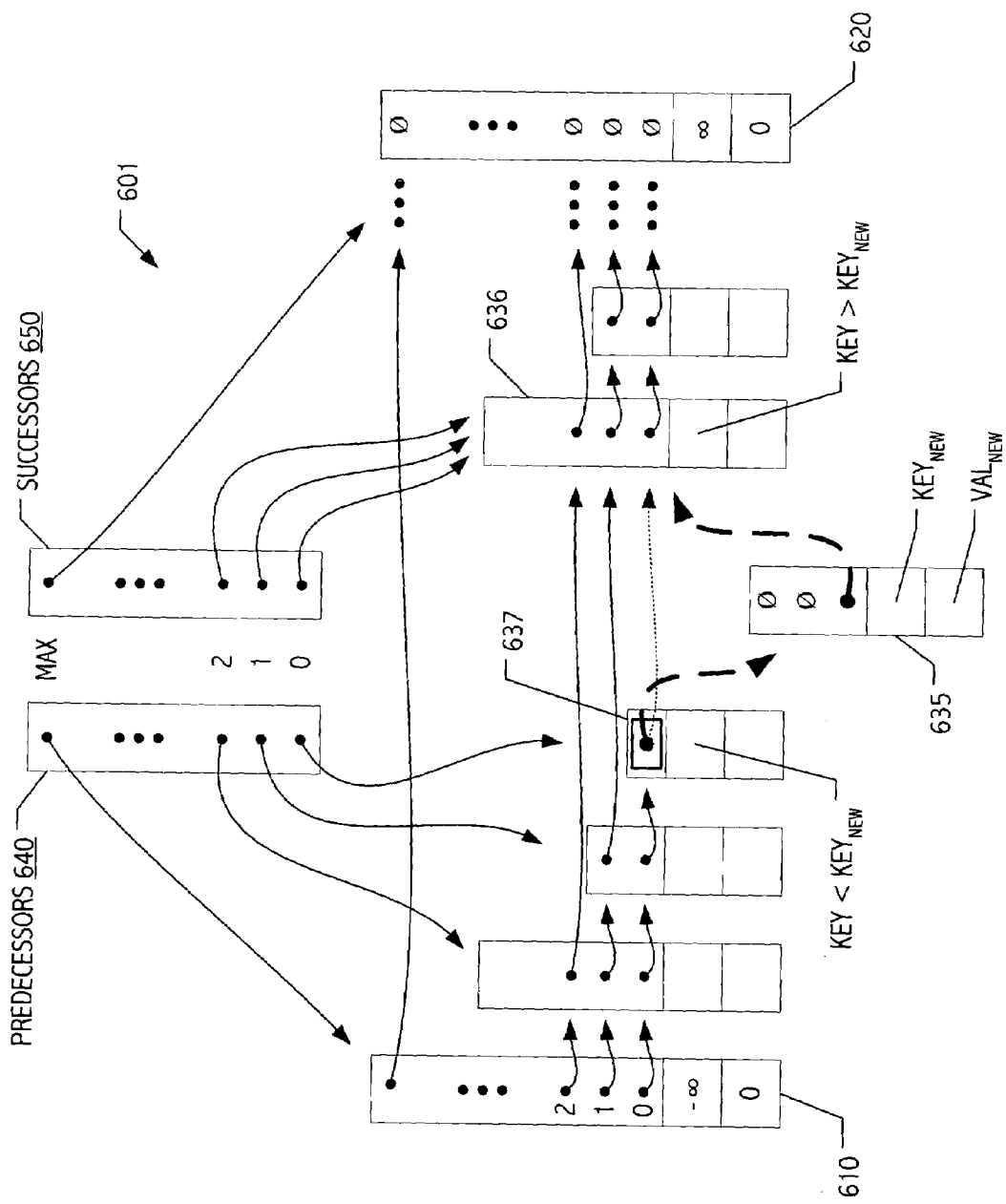
FIG. 6 illustrates an exemplary first state of a key-value skip list data structure consistent with some insert-oriented executions of a lock-free linearizable insert operation implemented in accordance with some embodiments of the present invention.
Figure 7:
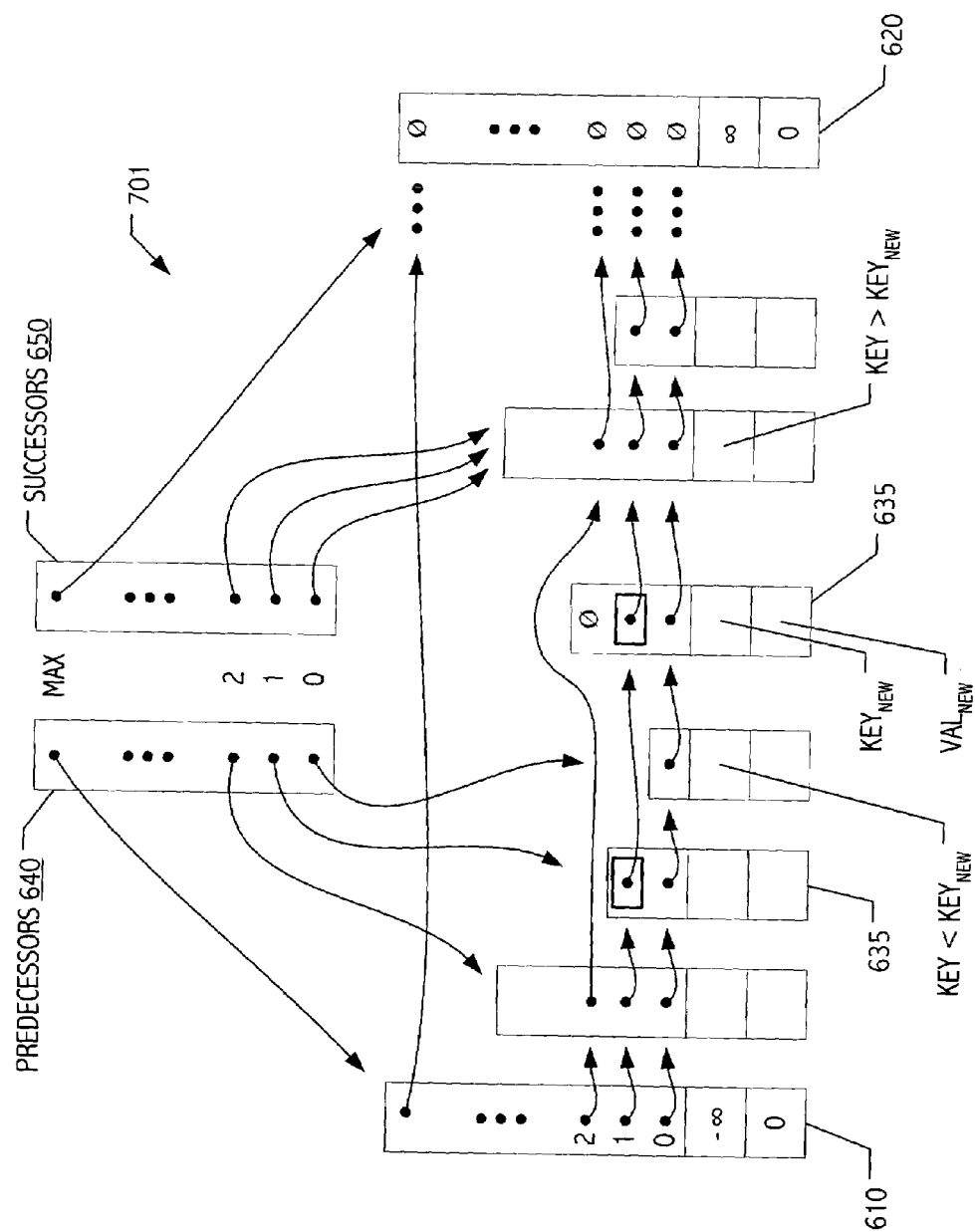
FIG. 7 illustrates an exemplary second state of a key-value skip list data structure consistent with the insert-oriented execution of illustrated in FIG. 6.

Turning next to the insertion case, FIGS. 6 and 7 illustrate insertion of a new node 635 into the skip list. As before, predecessor and successor arrays 640 and 650 are computed using techniques such as illustrated above with reference to the insertSearch helper routine. Since the level-0 pointer of successor array 650 (e.g., successor[0]) identifies a skip list node 636 with a key greater than that for the key-value pair we are inserting, we insert new node 635 as indicated. Height of new node 635 (in the illustrated case, height=3) is determined in accordance with customary skip list implementations (e.g., using a pseudorandom technique such as illustrated by the chooseHeight ( ) helper routine described below). New node 635 is inserted into the skip list using a CAS operation to link it into the chain of level-0 pointers. In the illustrated case, the CAS operation targets the level-0 pointer of node 637. Only after the level-0 pointer splice has succeeded is the node linked into chains at other levels, as described below.

Additional pointer operations are performed in order from lower levels to higher levels. In the illustrated case, pointers are updated at level-1 and level-2. DCAS operations are used to perform these higher level pointer splices and FIG. 7 illustrates the resultant state from use of a DCAS operation targeting level-1 pointers of node 638 and new node 635. Both the update case and the insert case will be better understood with reference to the following pseudo code.

```
/* Returns INSERTED or the value that was removed
   by the update */
public val insert(val newKey, val newValue) {
  Node[ ] predecessors = new Node[MaxHeight];
  Node[ ] successors = new Node[MaxHeight];
  Node newNode = null;
  mainInsert: while (true) {
    insertSearch(newKey, predecessors, successors);
    Node nd = successors[0];
    if (nd != NullNode && nd.key == newKey) {
      /* Attempt update */
      Node successor = nd.next[0];
      updateDcas: while (true) {
        val oldValue = nd.value;
        successor = nd.next[0];
        if (deadPointer(nd, successor))
          break updateDcas;
        if (DCAS(&nd.next[0], &nd.value,
                successor, oldValue,
                successor, newValue))
          return oldValue;
      }
      /* We fell out bottom of update loop.
         The node was deleted before we could update it,
         so retry whole insertion effort. */
    } else {
      /* Attempt insertion */
      if (newNode == null)
        newNode = new Node(chooseHeight( ), newKey, newValue);
      newNode.next[0] = successors[0];
      if (CAS(&predecessors[0].next [0], successors[0],
              newNode)) {
        /* The new node is in; now install the higher
           links (hints). */
        hints: for (int k = 1; k < newNode.next.length; k++) {
          thisHint: while (true) {
            if (DCAS(&predecessors[k].next[k],
                   &newNode.next[k], successors[k],
                   null, newNode, successors[k]))
```

-continued

```
        continue hints;
        /* We failed to install a hint; why? */
        if (deadPointer(newNode, newNode.next[k])) {
            /* Deletion has begun on the node we inserted.
               Our job is done here. */
            break hints;
        } else if
            (deadPointer(predecessors[k],
                    predecessors[k].next[k])) {
            /* Deletion has begun on the predecessor.
               Redo the search. */
            insertSearch(newKey, predecessors, successors);
            if (successors[0] != newNode)
                /* the node we were installing has been killed
                   so we have finished installing it. */
                break hints;
        } else {
            /* The predecessor is still in the list, but
               its successor has changed. */
            insertSearch(newKey, predecessors, successors);
            if (successors[0] != newNode)
                break hints;
        }
    } /* end thisHint */
} /* end hints */
return INSERTED;
}
/* We failed the initial ("real") insertion, so loop,
   recompute preds and succs arrays, and retry. */
}
} /* end mainInsert */
}
```

Figure 8A:
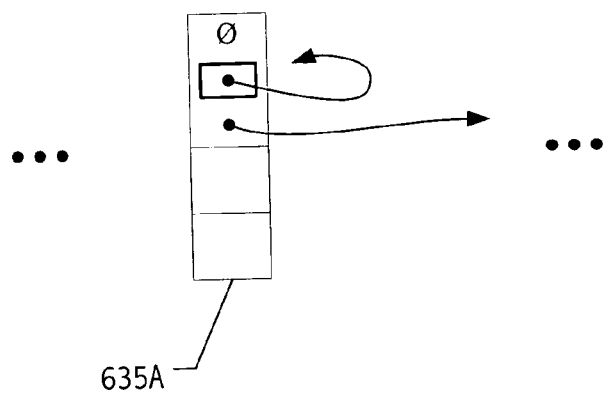
FIGS. 8A, 8B and 8C illustrate respective states of a key-value skip list data structure detected by operation of DCAS operation (or other multi-target synchronization operation) in some executions of a lock-free linearizable insert operation implemented in accordance with some embodiments of the present invention.
Figure 8B:
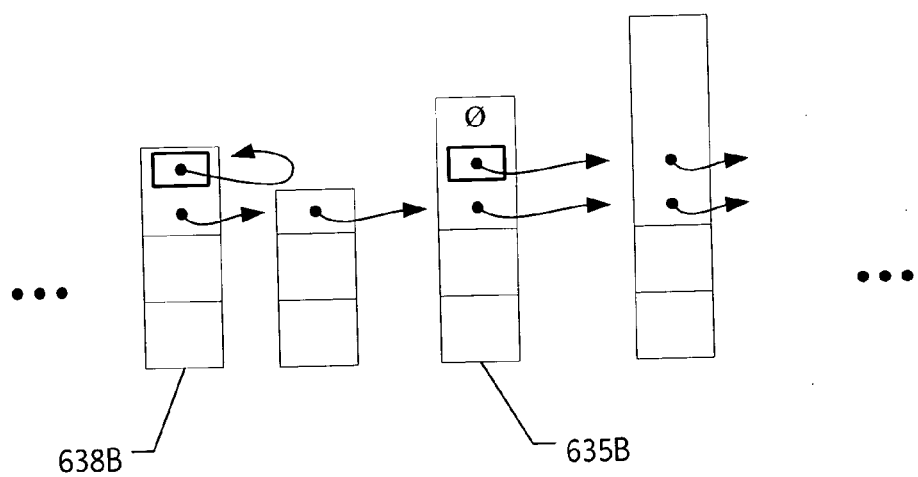
Figure 8C:
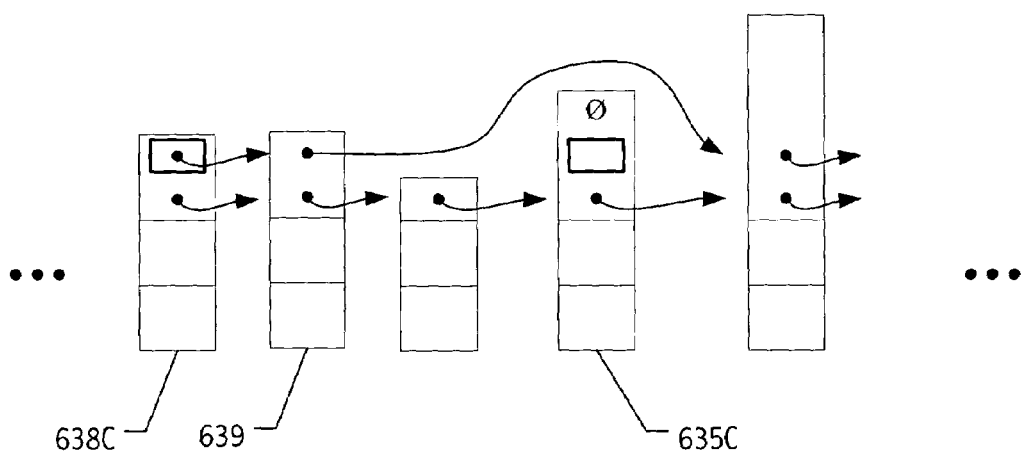

As will be appreciated by persons of ordinary skill in the art, the DCAS operation will fail if either of its targets differs from its expected value. FIGS. 8A, 8B and 8C illustrate several DCAS failure situations handled by the insert code shown above. For example, as illustrated in FIG. 8A, the DCAS operation may discover that that new node 635A is in the process of being deleted, as signified by a self-pointer deleted node encoding. Of course, detection of other deleted node encodings is analogous and will be understood with reference to exemplary pseudo code presented above and below. In general, the DCAS operation may discover a deleted node encoding at any pointer level (i.e., newNode.next[n]) as insert climbs upward, installing hints. Because insert climbs upward to install hints, while a corresponding delete operation, e.g., the deleteGE operation described below, installs deleted node indications moving downward, insert will discover a concurrently executed deletion operating on the same node. Insertion is considered complete upon discovering that the node is being deleted.

Just as the newly inserted node may be in the process of being deleted, so too may be a node that is to be its predecessor at some pointer level (e.g., predecessor[n]). FIG. 8B illustrates discovery (by insert) that the predecessor node 638B at level-1 for new node 635B is in the process of being deleted. As before, in the illustrated case, a self pointer is used as a deleted node encoding although other encodings are also possible and described elsewhere herein. If a predecessor node is being deleted, we redo the search (invoking insertSearch). If the new node is no longer in the skip list, we quit. Otherwise, we continue the upward climb installing hints in accordance with the "new" predecessor and successor arrays returned by insert Search.

Another situation involves discovery (by insert) that a predecessor node is no longer an immediate predecessor of a new node as encoded by contents of predecessor[n].next[n]. In particular, FIG. 8C illustrates a situation in which the presumed level-1 predecessor node 638C is no longer an immediate predecessor of new node 635C. Instead, an intermediate node 639 has been introduced in the level-1 pointer chain. Accordingly, we redo the search (invoking insertSearch). If the new node is no longer in the skip list, we quit. Otherwise, we continue the upward climb installing hints in accordance with the "new" predecessor and successor arrays returned by insertSearch.

When inserting a new node, skip list semantics customarily involve some random selection of height. The illustrative chooseHeight code below provides one suitable pseudorandom height selection implementation. Note that, for simplicity of illustration, we use a typical built-in system routine such as lrand, which generally employs locks. To avoid this problem, a lock-free pseudo-random number facility or one which is unique to each calling thread should be used. Other height selection techniques may be employed if desirable.

```
public int chooseHeight( ) {
    /* sample algorithm -- lrand actually uses lock so no good */
    int discardBits = 4; // in some generators low bits are suspect
    long lrand = lrand48( );
    int ch = 1;
    int mask = 1 << discardBits;
    for (int i=1; i<MaxHeight; i++)
        if ((lrand & mask) == 0)
            return ch;
        else {
            mask = mask << 1;
            ch++;
        }
    return ch ;
}
```

We now turn to deletions. As described above, our exemplary implementation provides a delete-greater-than-or-equal-to style deletion operation (deleteGE) which identifies the smallest key k that is not smaller than n and that has an associated value in the dictionary, then alters the skip list so that it no longer associates any value with the key k and returns the value (if any) that was formerly associated with k. Based on the description herein, persons of ordinary skill in the art will appreciate variations for other semantics, such as an exact-match version of delete that returns a value from the deleted node or a flag value meaning no node with a matching key was in the list.

As before, we use a helper routine to identify an appropriate point in the skip list. In particular, to identify the appropriate deletion point, a helper routine (deletesearch) is employed to identify (at each pointer level of the skip list) predecessor nodes of a node matching the key criterion described above. Of course, the identification of a predecessor node set is susceptible to skip list changes introduced by concurrent executions of other deleteGE operations as well as concurrent executions of insert-type operations. Operation of an exemplary deleteGE routine that appropriately synchronizes with other such executions will be understood with reference first to the following exemplary implementation of a deleteSearch routine.

```
private Node deleteSearch(val searchKey, Node[ ] predecessors) {
    topSearch: while (true) {
        Node pred = Head;
        Node succ;
        for (int k = MaxHeight - 1; k >= 0; k--) {
            while ((succ = pred.next[k]) != NullNode &&
                    succ.key < searchKey) {
```

-continued

```
        if (deadPointer(pred, succ)) {
          /* We got stuck on a deleted node and must retry. */
          continue topSearch;
        }
        else pred = succ;
      }
      if (deadPointer(pred, succ)) {
        continue topSearch;
      } else predecessors[k] = pred;
    } /* end for loop */
    return succ;
  }
}
``` where, as before, a deadPointer routine or macro allows us to isolate implementation variations for realizations that encode dead pointers using a DeadNode construct or a self-pointer.

In either case, the deleteGE routine (see below) employs the deleteSearch helper routine to identify an appropriate predecessor set. If the level-0 pointer of the predecessor set identifies a particular skip list node (other than the terminating null node), we attempt to excise the next node from pointer chains at each level thereof. We begin at the highest level chain in which the node to be removed appears (i.e., the level corresponding to the highest index of the node which follows the identified predecessor node, namely predecessor[0].next[length-1]). Excision continues at successive lower levels until the appropriate node is excised from each level of pointer chain. By installing dead pointers at each successive level, we can coordinate concurrent executions of insert-type and delete-type operations.

```
/* Returns either NOTFOUND or a value such that the key that
   stored that value was the smallest key in the skiplist
   not less than searchKey. */
public val deleteGE(val searchKey) {
  Node[ ] predecessors = new Node[MaxHeight];
  Node successor;
  deletion: while (true) {
    successor = deleteSearch(searchKey, predecessors);
    Node nd = successor;
    if (nd == NullNode) return NOTFOUND;
    /* Found node to delete.
       Rip out the hints. (The last "hint" is
       what counts as the actual deletion.) */
    hints: for (k = nd.next[0].length - 1; k >= 0; k--) {
      thisHint: while (true) {
        Node next = nd.next[k];
        if (deadPointer(nd, next)) {
          /* Some other node has begun deletion of this node.
             We'll compete. If we have reached the bottom --
             competiton is over and we lost! */
          if (k==0) continue deletion; //other guy won
          else continue hints; //keep on racing
        } else if (next == null) {
          /* This level is not really linked in yet.
             Kill it anyway */
          /// DeadNode version
          if (CAS(&nd.next[k], null, DeadNode))
            continue hints;
          /// self-pointer version
          if (CAS(&nd.next[k], null, nd)) continue hints;
          /* CAS failure means the null changed out from
             under us. Loop back and try again. */
        } else {
          /// DeadNode version
          Node del = DeadNode;
          /// self-pointer version
          Node del = nd;
          if (DCAS(&predecessors[k].next[k], &nd.next[k],
              nd, next, next, del))
            continue hints;
          /* We failed to remove a hint; why? */
          if (deadPointer(nd, nd.next[k])) {
            /* We are competing with another node to remove
               hints. That's cool. Continue to compete (unless
               this was the actual deletion!) . */
            if (k == 0)
              continue deletion; /* Oops! The other guy
                                    actually deleted the node. */
            else
              continue hints;
          } else if (deadPointer(predecessors[k],
                                 predecessors [k].next [k])) {
            /* Deletion has been done at kth level of
               predecessor. Redo the search. */
            continue deletion;
          } else {
            /* The predecessor is still in the list, but its
               successor has changed. */
            /* This is where partial re-searching from one
               level higher can be tried to avoid the avoid
               the cost of a full deleteSearch*/
            /* if no local recovery, try again from the top */
            continue deletion;
          }
        }
      } /* end thisHint */
    } /* end hints */
    /* Notice that we don't fetch nd.value until after the
       node has been completely deleted, in case an insert
       operation updates the value. */
    return (nd.value);
  } /* end deletion */
}
```

When a node is to be deleted from the data structure, first DCAS operations are used to delete the hints, that is, to remove the node from chains at higher levels than level 0. These hint deletions are performed in order from higher levels to lower levels: . . . , level-3, level-2, level-1. As a node is removed from the chain at any given level, its level-k pointer is changed to be a dead pointer (using one of the alternate representations of a dead pointer as described above). Only after all hints have been removed is the node removed from the level-0 chain (using a DCAS operation); only then is it regarded as having been removed from the skip list.

Figure 9:
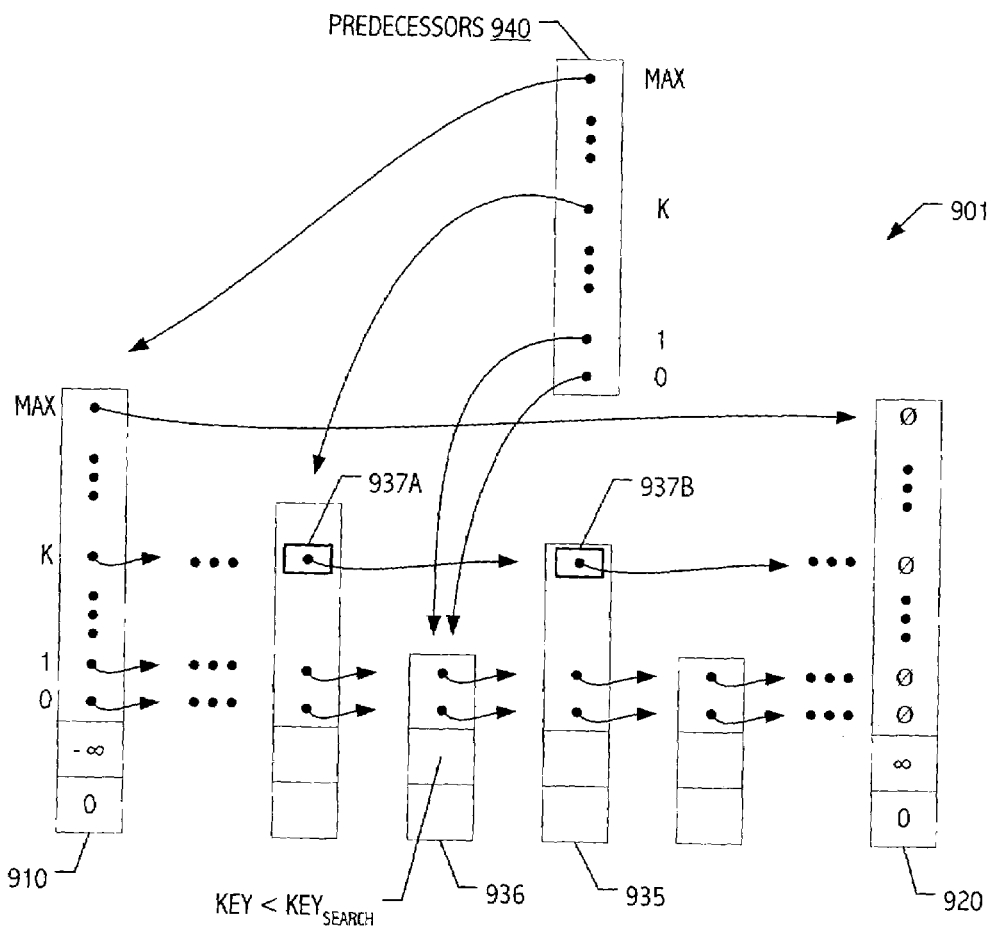
FIG. 9 illustrates an exemplary state of a key-value skip list data structure consistent with some executions of a lock-free linearizable deleteGE operation implemented in accordance with some embodiments of the present invention.

FIG. 9 illustrates targets of a DCAS operation attempting to remove the hint at level-k of the skip list. Predecessor array 940 identifies nodes of skip list 901 for which respective next nodes at each level of pointer chain each have an associated key value greater than or equal to the search key. Of note, in the illustrated case, the level-0 entry in predecessor array 940 (i.e., predecessor[0]) identifies node 936 for which an immediate next node 935 in skip list 901 is the node initially targeted for deletion by operation of a delete-type operations such as implemented by the deleteGE method detailed above. As described above, deletions begin with synchronized updates at higher levels of pointer chains (or hints) and progress downward toward level-0 pointer chains. In the illustrated case, the node initially targeted for deletion (i.e., node 935) has height K+1, so we start with level-K pointers. A DCAS operation targets pointers 937A and 937B for synchronized update. Assuming that both targets of the DCAS continue to encode the respective expected values, the DCAS successfully completes, bridging the to-be-deleted node at level-K and introducing a dead pointer at level-K of the to-be-deleted node.

Figure 10A:
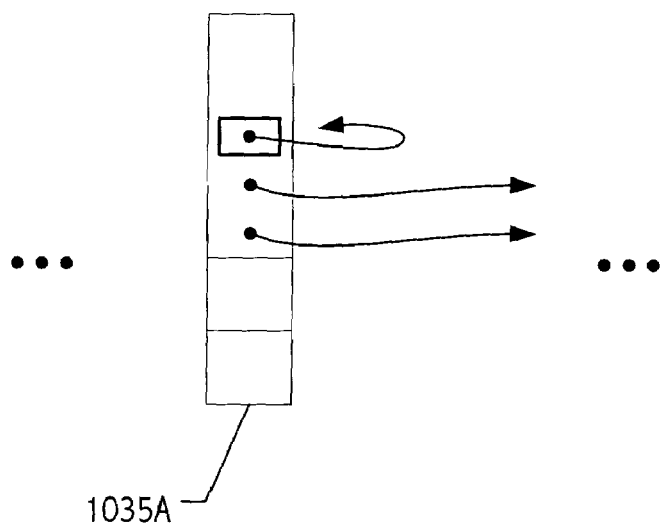
FIGS. 10A and 10B illustrate respective node states in a key-value skip list data structure which are detected by specific failures of a DCAS operation and which, when encountered by an execution of a lock-free linearizable deleteGE operation implemented in accordance with some embodiments of the present invention indicate concurrent execution of another deleteGE operation.
Figure 10B:
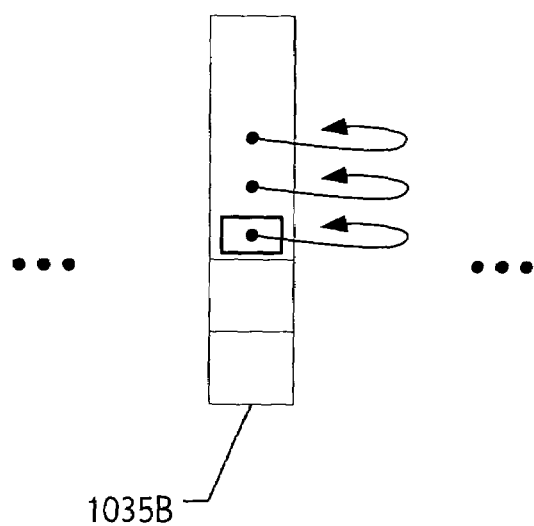

Assuming no interactions with concurrently executed deleteGE operations targeting the same node, DCAS-based updates simply continue at successive lower level pointers until the node (e.g., node 935) is removed from skip list 901. Even in the case of a competing deleteGE invocation, which is detected based on presence of a dead pointer at level-K of the to-be-deleted node after a level-K DCAS failure, we continue at successive lower levels. FIG. 10A illustrates a state of the targeted node (e.g., with a detected level-K, self-pointer encoding) consistent with operation of another competing deleteGE invocation targeting the same node, and in which we continue at successive lower levels in competition with the other deleteGE invocation. However, if another competing deleteGE invocation is first to reach level-0 (i.e., if the competing deleteGE invocation actually deletes the targeted node), we search again (e.g., continue and reinvoke deletesearch). FIG. 10B illustrates the latter state.

Of course, a concurrently executing operation may also affect the state of a predecessor node. Accordingly, if the reason for DCAS failure was an unexpected next pointer of a predecessor node (e.g., a dead pointer or insertion of an intermediate node), then these failures are the result of progress being made by another thread. We must search again; partial re-searching and back-pointer following are allowable optimizations to attempt here, but for simplicity we illustrate with the fall-back method of continuing the outer loop and reinvoking deleteSearch.

Finally, interactions between concurrent executions of insert and deleteGE operations targeting the same node bear further explanation. If thread A inserts a node and then thread B attempts to delete the node before thread A has installed all the hints, there may appear to be a sort of race condition in which thread A is trying to install hints and thread B is trying to remove them. One interesting aspect of the implementations described herein is a technique for avoiding such a race condition. As thread B deletes hints, it replaces pointers in the node being deleted with dead pointers. The dead pointers serve as an indication that the pointer has been deleted, and distinguishes this situation from a situation where the hint pointer has not yet been installed at all. If thread A, while trying to install hints, encounters such a dead pointer in the node, it means that some other thread is trying to delete the node. Thread A therefore simply abandons all attempts to install the remaining hint pointers. The fact that hint installation proceeds from lower levels to higher levels and hint deletion proceeds from higher levels to lower levels facilitates this determination.

Other Embodiments

Exemplary code presented above illustrates a set of implementations in which deleted hints (or pointers) are represented by self pointers or dead node pointers. Variations for the alternative encodings differ in only a few lines of code and are generally noted in-line. Another variation previously mentioned involves representing deleted hints (or pointers) using a back pointer encoding (i.e., a pointer to a node having a lesser key). Although suitable code modifications will be readily understood based on the preceding description, they are less amenable to in-line notation. Accordingly, we simply present below an alternative formulation of our techniques in which deleted hints (or pointers) are encoded using back pointers. In particular, modified versions of insert, deleteGE, insertSearch and deleteSearch are included below. Skip list and node definitions are uniform amongst the exemplary code implementations.

In view of the above, an analogous, back-pointer based implementation of the insertSearch helper routine is as follows:

```
/* This routine takes a key and searches the skiplist. It
    returns results in two supplied arrays, predecessors and
    successors, each of length Maxheight.
    For all k such that 0 <= k < MaxHeight, these results have
    the properties that
    predecessors[k].key < searchKey <= successors[k].key
    and that at some point in the past
    predecessors[k].next[k] == successors[k] was true.
    Also, predecessors[k] is never NullNode and successors[k] is
    never Head. Also, height(predecessorst[k]) > k and
    height(successors[k]) > k. */
private void insertSearch(val searchKey, Node[ ] predecessors,
                            Node[ ] successors) {
    Node pred = Head;
    Node succ;
    for (int k = MaxHeight − 1; k >= 0; k−−) {
        while ((succ = pred.next[k]) != NullNode &&
                succ.key < searchKey) {
            pred = succ;
        }
        predecessors[k] = pred;
        successors[k] = succ;
    }
    return;
}
```

Building on the modified insertSearch helper routine, a back-pointer based implementation of the insert routine is detailed below. As before, we either update an existing node having a key identical to the search key, or insert a new node. Also as before, update employs a DCAS operation. Introduction of a new node, if required, employs a CAS operation and installation of each successive level of hints employs a DCAS operation.

```
/* Returns INSERTED or the value that was
    removed by the update */
public val insert(val newKey, val newValue) {
    Node[ ] predecessors = new Node[MaxHeight];
    Node[ ] successors = new Node[MaxHeight];
    Node pred, succ;
    Node newNode = null;
    insertSearch(newKey, predecessors, successors);
    tryInsert: while (true) {
        Node nd = successors[0];
        if (nd != NullNode && nd.key == newKey) {
            /* key is equal so attempt update */
            tryUpdate: while (true) {
                Node successor = nd.next[0];
                val oldValue = nd.value;
                if ((successor != NullNode) &&
                        (successor.key < newKey)) {
                    /* nd is dead −− follow bkptr at level 0
                        to repair successors[0] */
                    while (successor.key < newKey) {
                        successor = successor.next[0];
                    }
                    successors[0] = successor;
                    continue tryInsert;
                }
                if (DCAS(&nd.next[0], &nd.value,
                            successor, oldValue,
                            successor, newValue))
                    return oldValue;
            } /* end tryUpdate */
            // control should not get here
        }
        else {      /* Attempt insertion */
            if (newNode == null)
                newNode = new Node(chooseHeight( ), newKey, newValue);
            newNode.next[0] = successors[0];
            if (CAS(&predecessors[0].next[0],
                    successors [0], newNode)) {
```

-continued

```
hints: for (int k = 1; k < newNode.next.length; k++) {
    thisHint: while (true) {
        if (DCAS (&predecessors[k].next[k], &newNode.next[k],
                  successors[k], null,
                  newNode, successors[k]))
            continue hints;
        /* We failed to install a hint; why? */
        if (newNode.next[k] != null) {
            /* Deletion has begun on the node we inserted.
               Our job is done here. */
            break hints;
        }
        else { /*    info from predecessors[k] has changed so
                     chase its (possibly backward) pointer */
            pred = predecessors[k];
            while  ((succ = pred.next[k]) != NullNode &&
                    succ.key < newKey) {
                pred = succ;
            }
            predecessors[k] = pred;
            successors[k] = succ;
        }
        // fall through to try installing this hint again
    } /* end thisHint */
} /* end hints */
return INSERTED;
} else {
    /* We failed the initial ("real") insertion, so chase
       possibly backward next pointers to repair level zero
       hints then retry. */
    pred = predecessors[k];
    while  ((succ = pred.next[0]) != NullNode &&
            succ.key < newKey) {
        pred = succ;
    }
    predecessors[0] = pred;
    successors [0] = succ;
}
}
} /* end tryInsert */
}
```

Advantageously, the back pointer implementation illustrated herein allows the insert operation to chase back pointers to "repair" certain predecessor or successor set entries without reinvoking the insertSearch helper. Of course, some realizations may forego this potential advantage.

Turning to an exemplary back pointer implementation of deletion, we again employ a deleteSearch helper routine such as the following:

```
/*  This routine takes a key and searches the skiplist.
    Returns results in a supplied array, predecessors, of
    length MaxHeight,and also returns a node "result".
    For all k such that 0 <= k < MaxHeight,
    predecessors[k].key < searchKey (therefore predecessors[k]
    is never NullNode) and height(predecessors[k]) > k.
    Moreover, searchKey <= result.key and at some point in
    the past predecessors[0].next[0] was equal to the
    result node, though others may have been inserted since. */
private Node deleteSearch(val searchKey, Node[ ] predecessors) {
    Node pred = Head;
    Node succ;
    for (int k = MaxHeight – 1; k >= 0; k––) {
        while ((succ = pred.next[k]) != NullNode &&
               succ.key < searchKey) {
            pred = succ;
        }
        predecessors[k] = pred;
    } /* end for loop */
    return succ;
}
```

Building on the modified deleteSearch helper routine, a back-pointer based implementation of the deleteGE routine is detailed below. As before, we manage concurrent executions of same target deleteGE and insert operations using a dead pointer encoding, which in this case employs a back pointer. Also as before, deletion of hints employs a DCAS operation. As with the back-pointer-based insert routine, the back pointer implementation allows the deleteGE operation to chase back pointers to "repair" certain predecessor or successor set entries without reinvoking the deleteSearch helper.

```
/*  Returns either NOTFOUND or a value such that the key that
    stored that value was the smallest key in the skiplist not
    less than searchKey. */
public val deleteGE(val searchKey) {
    Node[ ] predecessors = new Node[MaxHeight];
    Node pred, succ, successor;
    successor = deleteSearch(searchKey, predecessors);
    deletion: while (true) {
        Node nd = successor;
        if (nd == NullNode) return NOTFOUND;
        /* nd is the chosen GE node to remove. Rip out the hints.
           (The last "hint" is what counts as the actual deletion.) */
        deleteThisOne: {
            hints: for (int k = nd.next.length – 1; k >= 0; k––) {
                thisHint: while (true) {
                    Node next = nd.next[k];
                    if (next == null) {
                        /* This level is not really linked in yet. */
                        if (CAS(&nd.next[k], null, predecessors [k]))
                            continue hints;
                        else
                            /* CAS failure means the null changed out from
                               under us. Loop back and try again. */
                            continue thisHint;
                    } else if (next.key < nd.key) { // back pointer
                        /* Some other node has begun deletion of this node.
                           We'll compete. If we have already reached the
                           bottom, the competition is over and we lost! */
                        if (k==0) break deleteThisOne;   /*    another thread
                                                                won the race */
                        else continue hints; // keep on racing
                    } else {
                        if (DCAS(&predecessors[k].next[k], &nd.next[k],
                                  nd, next,
                                  next, predecessors[k]))
                            continue hints;
                        /* We failed to remove a hint; why? */
                        if (nd.next[k].key < nd.key) { /*    this pointer
                                                              is dead */
                            /* We are competing with another node to remove
                               hints. That's cool. Continue to compete (unless
                               this was the actual level 0 deletion!). */
                            if (k == 0)
                                break deleteThisOne; /*    another thread actually
                                                            deleted the node. */
                            else
                                continue hints;
                        } else {
                            /* predecessors[k] info is outdated so chase
                               pointers to fix it. It can be due to
                               successor or predecessor changing */
                            pred = predecessors[k];
                            while((succ = pred.next[k]) != NullNode &&
                                   succ.key < searchKey) {
                                pred = succ;
                            }
                            if (succ != nd) {
                                /* Oops . . . we have found a better node to
                                   delete . . .   */
                                break deleteThisOne;
                            } else {
                                predecessors[k] = pred;
                                continue thisHint;
                            }
                        }
                    }
                } /* end dcas failed */
```

-continued

```
    } /* end thisHint */
  } /* end hints */
  /* Notice that we don't fetch nd.value until after the
     node has been completely deleted, in case an insert
     operation updates the value. */
  return (nd.value);
} /* end deleteThisOne */
/* we've lost the node we were working on, but most hints
   are still good so find new node to del and fix
   predecessors as needed . . .   */
pred predecessors[0]; // deleted pointer
while((succ = pred.next[0]) != NullNode &&
      succ.key < searchKey) {
  pred = succ;
}
predecessors[0] = pred;
} /* end deletion */
}
```

While the invention has been described with reference to various embodiments, it will be understood that these embodiments are illustrative and that the scope of the invention is not limited to them. Terms such as always, never, all, none, etc. are used herein to describe sets of consistent states presented by a given computational system. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while various key-value dictionary realizations have been described in detail, realizations implementing other shared object data structures, including other realizations that employ skip list or skip list like data structures, will also be appreciated by persons of ordinary skill in the art. In addition, more complex shared object structures may be defined that exploit the basic techniques described herein. Other synchronization primitives or constructs may be employed and a variety of distinguishing pointer values may be employed including without limitation, the self-referencing pointer values, back pointer values, marker (or dead) node pointers and null pointers employed in some realizations described herein. In general, the particular data structures, synchronization primitives and distinguishing pointer values employed are implementation specific and, based on the description herein, persons of ordinary skill in the art will appreciate suitable selections for a given implementation. Further, while pointers are used throughout the description and full-length memory address pointers are generally assumed, implementations that employ application-specific (e.g., reduced width or index-based) referencing schemes and chains are also possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of operating on a shared data structure that includes a representation of an ordered set of keys, the method comprising:

instantiating nodes of the shared data structure in memory, wherein plural levels of same direction referencing chains traverse respective subsets of the nodes in accordance with a key ordering relationship thereof, a first-level of the referencing chains traversing each node of the shared data structure and at least one other level of the referencing chains traversing less than all nodes of the shared data structure; and operating on the shared data structure using insert-type and delete-type operations that are linearizable and lock-free for all concurrent executions thereof, wherein the insert-type operation performs a synchronized update of pointers beginning at the first level thereof and continuing upward, and wherein the delete-type operation performs a synchronized update of pointers beginning at a $K^{th}$ level thereof and continuing downward to the first level.

2. The method of claim 1, wherein the insert-type operation performs a synchronized update of pointers in accordance with a first succession of the levels; and wherein the delete-type operation performs a synchronized update of pointers in accordance with a second succession of the levels, the second succession opposing the first succession.

3. The method of claim 1, further comprising:

for a given one of the nodes instantiated, dynamically selecting a number of the plural, same-direction referencing chains that traverse the given node.

4. The method of claim 1, wherein the shared data structure implements a dictionary.

5. The method of claim 1, wherein values are associated with respective ones of the keys, the method further comprising:

as part of an execution of the insert-type operation introducing a value into the shared data structure; and as part of an execution of the delete-type operation removing a value from the shared data structure the removed value corresponding to a search key.

6. The method of claim 5, wherein the correspondence includes a greater-than-or-equal-to key match criterion.

7. A computer readable shared memory storing encoding of a shared object, the encoding comprising:

plural nodes;

plural levels of same-direction referencing chains that traverse respective subsets of the nodes in accordance with a key ordering relationship thereof, a first of the referencing chains traversing each node of the shared data structure and a second of the referencing chains traversing less than all nodes of the shared data structure; and a functional encoding of linearizable operations on the shared object, wherein the linearizable operations include both insert-type and remove-type operations and are lock-free for all concurrent executions thereof, wherein the insert-type operation performs a synchronized update of pointers beginning at the first level thereof and continuing upward, and wherein the delete-type operation performs a synchronized update of pointers beginning at a $K^{th}$ level thereof and continuing downward to the first level.

8. The computer readable storage medium encoding of claim 7, wherein, on at least some executions, the insert-type introduces an additional node into at least one of the referencing chains.

9. The computer readable storage medium encoding of claim 7, wherein, on at least some executions, the delete-type operation excises a particular node from all referencing chains that traverse the particular node.

10. The computer readable storage medium encoding of claim 7, wherein the delete-type operation employs a greater-than-or-equal-to key match criterion.

11. The computer readable storage medium encoding of claim 7, wherein the shared object implements a shared skip-list-type data structure.

12. The computer readable storage medium encoding of claim 7, wherein the shared object implements a dictionary data structure.

13. In a computational system that employs a shared list-type data structure that includes plural nodes and plural levels of referencing chains that traverse respective ones of the nodes in accordance with an ordering thereof wherein a higher-level one of the referencing chains traverses no more than a subset of the nodes traversed by a lower-level one of the referencing chains, a method of facilitating lock-free concurrent operations on the shared list-type data structure, the method comprising:

deleting a node from the shared list-type data structure by excising the node from successive ones of the referencing chains, beginning with a highest-level one of the referencing chains that traverses the node and continuing through a lowest-level one of the referencing chains, wherein each such excision employs a linearizable synchronization operation to bridge the excised node and associate a dead pointer indication therewith; and inserting a node into the shared list-type data structure by introducing the inserted node into one or more of the referencing chains, beginning with the lowest-level referencing chains and continuing through successive zero or more higher-level referencing chains.

14. The method of claim 13, wherein all concurrent executions of the deleting and the inserting are linearizable and lock-free.

15. The method of claim 13, wherein the dead pointer indication includes one of:
   a self pointer;
   a pointer to a dead node; and
   a back pointer.

16. A method comprising:
   defining a shared list-type data structure that includes plural nodes and plural levels of same direction referencing chains that traverse at least some of the nodes in accordance with an ordering thereof, wherein a higher-level one of the referencing chains traverses no more than a subset of the nodes traversed by a lower-level one of the referencing chains; and
   inserting into, and deleting from, the shared list-type data structure, wherein all concurrent executions of the deleting and the inserting are linearizable and lock-free,
   wherein the inserting comprises performing a synchronized update of pointers beginning at a first level and continuing upward, and
   wherein the deleting comprises performing a synchronized update of pointers beginning at a $K^{th}$ level and continuing downward to the first level.

17. An apparatus comprising:
   a definition of a skip list instantiable in storage; and
   lock-free means for coordinating concurrent and linearizable executions of both insert-type and delete-type operations on the skip list,
   wherein the insert-type operation performs a synchronized update of pointers beginning at the first level thereof and continuing upward, and
   a processor;
   wherein the delete-type operation performs a synchronized update of pointers beginning at a $K^{th}$ level thereof and continuing downward to the first level.

18. The apparatus of claim 17, further comprising:
   the storage.

19. The apparatus of claim 17, further comprising:
   plural processors, the insert-type and delete-type operations executable thereon.

* * * * *